United States Patent [19]

Wang

[11] Patent Number: 4,919,844

[45] Date of Patent: Apr. 24, 1990

[54] ENHANCED HEAT TRANSFER REFORMER AND METHOD

[75] Inventor: Shoou-I Wang, Allentown, Pa.

[73] Assignee: Air Products and Chemicals, Inc., Allentown, Pa.

[21] Appl. No.: 641,819

[22] Filed: Aug. 16, 1984

[51] Int. Cl.$^5$ .............................................. C10B 3/36
[52] U.S. Cl. .................................. 252/373; 48/197 R
[58] Field of Search ....................... 252/373; 48/197 R

[56] References Cited

U.S. PATENT DOCUMENTS

| | | | |
|---|---|---|---|
| Re. 24,311 | 5/1957 | Mader | 252/373 |
| 2,579,843 | 12/1951 | Mader | 252/373 |
| 3,264,066 | 8/1966 | Quartulli et al. | 252/375 |
| 4,071,330 | 1/1978 | Sederquist et al. | 48/94 |
| 4,079,017 | 3/1978 | Crawford et al. | 252/373 |
| 4,098,587 | 7/1978 | Krar et al. | 48/94 |
| 4,098,588 | 7/1978 | Buswell et al. | 48/94 |
| 4,098,589 | 7/1978 | Buswell et al. | 48/94 |
| 4,113,441 | 9/1978 | Suzuki et al. | 422/197 |
| 4,162,290 | 7/1979 | Crawford et al. | 252/373 |
| 4,376,758 | 3/1983 | Pagani et al. | 252/373 |
| 4,391,794 | 7/1983 | Silberring | 252/373 |

FOREIGN PATENT DOCUMENTS 3244252  5/1984  Fed. Rep. of Germany .

OTHER PUBLICATIONS

Olesen et al, *The UTC Steam Reformer*, United Technologies Corp., Santa Barbara, 1979.

*Primary Examiner*—Bruce D. Gray
*Attorney, Agent, or Firm*—Geoffrey L. Chase; James C. Simmons; William F. Marsh

[57] ABSTRACT

A method and apparatus are described for reforming hydrocarbons, particularly natural gas, to form hydrogen wherein the reformation is performed in a reactor in which the heat of reformed products are utilized to reform the hydrocarbons in a catalytic tube reformer. The reformer can be used in conjunction with a traditional steam reformer to produce hydrogen with less energy consumption, lower steam production and less capital cost.

5 Claims, 2 Drawing Sheets

ENHANCED HEAT TRANSFER REFORMER AND METHOD

TECHNICAL FIELD

The present invention is directed to an apparatus and a method for reforming hydrocarbons, particularly natural gas into a hydrogen rich product. More specifically, the present invention is directed to a unique catalyst filled tube reformer which utilizes the heat of reformed product to effect the reformation of hydrocarbons passing through the reformer.

BACKGROUND OF THE PRIOR ART

Various techniques are known in the prior art for the reformation of hydrocarbons and particularly for the reformation of lower hydrocarbons, such as natural gas, in order to produce hydrogen. Most of these techniques involve the production of steam in a natural gas fired furnace which also preheats the hydrocarbon stream to be reformed. The combined steam and hydrocarbon stream are then catalytically reformed in a reaction zone which is heated by the combustion products of the fired natural gas. In order to be thermodynamically efficient, such fired catalytic reformers require excess heat which can then be utilized to produce steam for use in the process or for export to outside consumption. Such a design creates an efficiency problem when sufficient steam requirements are not present near the reformation operation. In that event, expensive excess steam is produced which cannot be economically utilized.

In addition, it is known in the prior art to utilize multiple stages of reformation to produce hydrogen, such as is taught in U.S. Pat. No. 3,264,066. In that patent the staged serial reaction of hydrocarbons with steam to produce hydrogen is effected in a step wise manner wherein initial reaction occurs in the primary reformer and further complete reaction occurs in the secondary reformer wherein the reformation occurs on the same feed stream.

It is also known to heat exchange a reforming stream against a reformed stream in a fired catalytic reformer in order to effect energy efficiencies in the reformation reaction. This is disclosed in U.S. Pat. No. 4,071,330 wherein a feed stream is introduced into a longitudinal reactor and then returns as a product stream longitudinally back through the reactor in indirect heat exchange with the feed coming into the reactor. Additional heat is supplied by a fired burner which is segregated from the reaction streams.

It is further known to perform steam reformation to produce hydrogen in a reactor wherein tubular conduits situated in an array are provided with catalyst packing therein in order to perform the reformation reactor. In U.S. Pat. No. 4,113,441 such a system is disclosed wherein all of the heat of reaction is produced by an external stream which heat exchanges indirectly with the catalyst tubes. The reformation product is centrally removed in an axially aligned exit tube.

Finally, it is known to reform hydrocarbons in an indirect heat exchange with previously reformed product from a primary and secondary reformer wherein the product of the indirect heat exchange reformation is kept discrete from the reformed product which provides heat for the indirect heat exchange reformation. This is disclosed in U.S. Pat. No. 4,162,290 wherein a primary, secondary and tertiary reformer are utilized in which the tertiary reformer is an exchanger-reactor.

Additional art of interest includes U.S. Pat. No. 4,079,017, U.S. Pat. No. 4,098,587, U.S. Pat. No. 4,098,588 and U.S. Pat. No. 4,098,589.

BRIEF SUMMARY OF THE INVENTION

The present invention comprises a reforming reactor having an outer shell which has a reactant inlet, a product inlet and at least one product outlet, a plurality of reaction tubes open at each end thereof and containing a reforming catalyst wherein the inlet end of the tubes communicates with the reactant inlet of said shell and the outlet end of the tubes communicates with the product inlet and outlets of said shell, a heat exchange means within said shell and outside said plurality reaction tubes for enhancing heat transfer from the product to the reactant of said reactor, a plate mounted within said shell for positioning of the plurality of tubes in a potentially fixed array and a refractory lining on the interior of at least a portion of said shell.

Preferably, the heat exchange means comprises finned external surfaces on the reactor tubes of high heat transfer capacity. The fins may be situated either longitudinally or transversely to the axis of the tubes. Alternately, the heat exchange medium can comprise a packing outside the reaction tubes of Raschig rings or spherical balls of ceramic or aluminum composition.

The present invention also comprises a method for reforming hydrocarbons, particularly natural gas to produce hydrogen, including the steps of introducing a reactant stream of hydrocarbons and steam at elevated temperature and pressure into a reforming zone, passing the reactant stream through a plurality of reaction tubes and contacting the reactant stream with reforming catalyst packed in said tubes, introducing a reformed reaction product at elevated temperature and pressure into the reforming zone at a temperature substantially above the temperature of the reactant stream at the latter's introduction into the zone, mixing the reformed reaction product with similar product produced from the reaction stream passing through said reaction tubes, heating said reactant stream to reaction temperature in said reaction tubes by heat exchange of said mixed reaction product with said reactant stream and removing a mixed reaction product reformed fluid from said reforming zone.

Preferably the mixed reaction product flows substantially longitudinally along the outside surface of said reaction tubes from the tube outlet before exiting the reforming zone.

Specifically, the method is utilized wherein the hydrocarbon reformation in the reforming zone comprises one stage in a plural and parallel stage reformation wherein a first reformation of a reactant stream occurs in a first reforming zone heated by a combustion furnace and a second reformation of a reactant stream occurs in the reforming zone of an indirect heat exchange reformer which is heated by the reaction product of the first reformation zone.

Finally, the present invention includes the method for reforming hydrocarbons comprising the steps of heating and desulfurizing a hydrocarbon feed stream, blending the hydrocarbon feed stream with steam to produce a saturated hydrocarbon feed stream, splitting the saturated hydrocarbon feed stream into a main feed stream and a bypass feed stream, reforming said main feed stream in a first catalytic reformation zone used the heat of a combustion furnace, reforming the bypass feed stream in a second catalytic reformation zone using the heat of the reaction product in the first reformation zone, combining the reformation reaction products and introducing them into a shift reactor to shift any carbon monoxide to carbon dioxide and hydrogen, and cooling the reaction product and separating the hydrogen content of the reaction product from the remaining reaction components.

Preferably, the separation of hydrogen from other reaction products in this method is conducted in a pressure swing adsorption separation system comprising a switching array of adsorptive beds.

Preferably, the inclusion of steam in the feed to the reforming zone is accomplished by the introduction of water into the hydrocarbon feed stream wherein steam is formed in situ at the elevated temperature of the hydrocarbon feed stream and its subsequent heating in the combustion furnace.

DETAILED DESCRIPTION OF THE INVENTION

The present invention involves the reformation of hydrocarbons in the presence of steam and reformation catalyst. The reformation of hydrocarbons and particularly the reformation of natural gas to produce hydrogen is well known in the prior art. The reformation reaction is generally represented by the following stoichiometric equation: ps $$CH_4 + 2H_2O \rightarrow CO_2 + 4H_2 \qquad (1)$$ 

Generally the reformation reaction occurs in a stepwise manner from feed material to an intermediate incompletely reacted mixture of hydrogen, carbon monoxide, carbon dioxide, water and unreacted hydrocarbons to a final product subsequent to reformation and shift which comprises predominantly hydrogen and carbon dioxide with residual impurity. These reactions can be shown from the following two stoichiometric equations:

$$CH_4 + H_2O \rightarrow CO + 3H_2 \qquad (2)$$ 

$$CO + H_2O \rightarrow CO_2 + H_2 \qquad (3)$$ 

Generally, hydrocarbon reformation is conducted in a facility which is adjacent other industrial facilities wherein the abundance of steam produced from the reformation process is easily exported and sold for use in an adjacent industrial processes. The present invention provides a unique apparatus and method for producing hydrogen from the reformation of natural gas wherein the efficiency of the reformation is extremely high, while the production of steam is maintained at a low level sufficient for process conditions and providing for little or no export steam. This is particularly attractive in locations where the price or market for process steam is uneconomical or negligible.

The present invention utilizes the heat of one stage of reformation done in a conventional manner to provide the heat of reaction for a second parallel stage of reformation reaction wherein the efficiency of utilization of the heat of reaction is incorporated with savings in fuel use during the reformation reaction. This is accomplished by a unique reformation reactor which is illustrated in FIG. 1.

Figure 1:
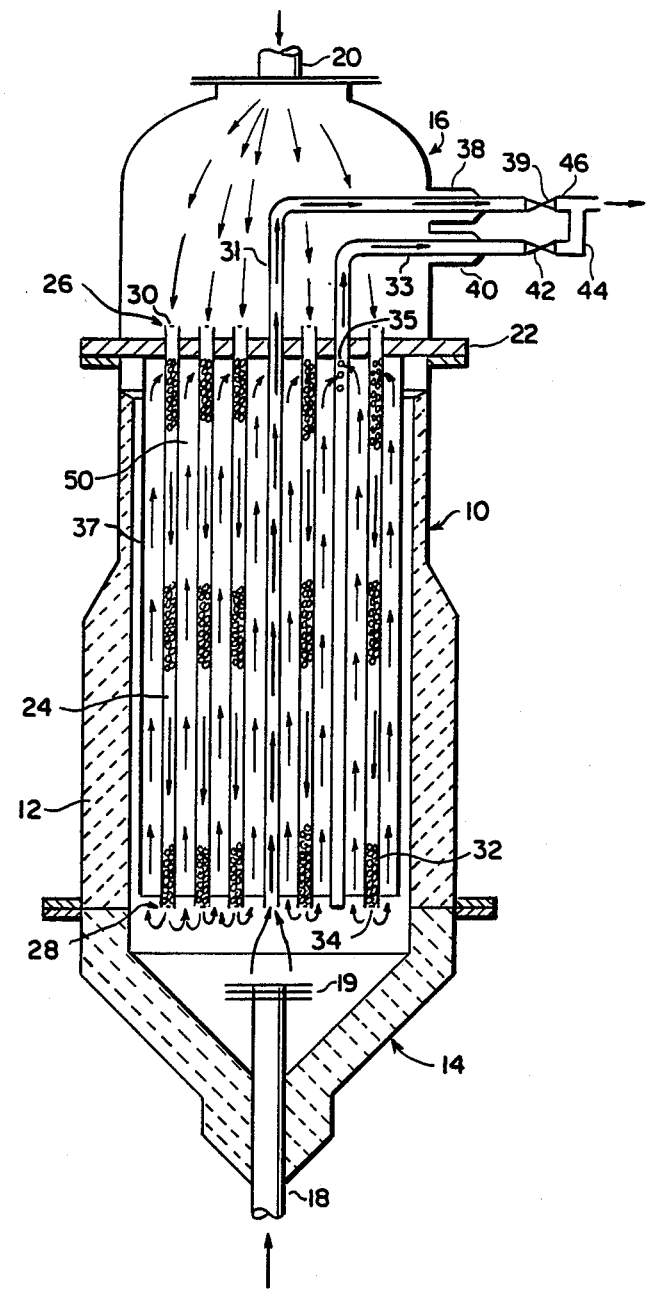
FIG. 1 is a schematic illustration of the reformer of the present invention.

With reference to FIG. 1 the present invention will now be described in greater detail with regard to one specific preferred embodiment. A generally elongated cylindrical reactor 10 comprises a reformation zone wherein the shell of the reactor 10 houses a discrete array of reaction tubes 24 held in the shell 10 by a tube sheet or plate 22 situated at the upper end 16 of the reactor 10 wherein the tube sheet or plate 22 completely closes off the end 16 of the reactor 10 except for the inlet ends 26 of the reaction tubes 24 and additional tubes 31 and 33. Preferably, the reactor's interior is lined with castable refractory insulation 12. A natural gas and steam stream comprising a hydrocarbon feed stream is introduced into the reactor 10 through reactant inlet 20. A heating medium is introduced through product inlet 18 and diffuser plate 19 at the lower end 14 of the reactor 10; the heating medium comprises reformation product from a separate primary reformer which is still at high level reformation temperatures. The previously reformed product stream introduced at product inlet 18 for the purposes of providing heat to the reformation zone is distributed within the zone shell side 50 by the diffuser plate 19 and a shroud 37 to provide distribution of the reformed product in the shell side portion of the reaction zone 50. Alternately, other forms of distribution such as a perforated plate, packing material or baffles may be utilized.

The efficient heat exchange between the reformed product and the feed is effected by finned surfaces on the reaction tube's exterior. These fins may be provided in a longitudinal or transverse axis or, optionally, in a helical wound winding around the exterior of the tubes 24. Alternately, the entire interior of the shell side of the reformation zone of the reactor 10 can be packed with heat exchange media which may comprise ceramic balls, aluminum balls or Raschig rings. These can provide rapid and effective heat exchange between the hot reformed product from an external reformer and the reaction tubes 24. A traditional reforming catalyst such as a nickel catalyst 32 is packed within the interiors of the various reaction tubes 24. The natural gas and steam passes through the reactant inlet 20 into the plenum area of the reactor 10 at end 16 and passes through the reaction tube inlets 26 of the various reaction tubes 24 which are fitted with a perforated end plate 30. The figure shows five tubes for illustration purposes only. The exact pattern or array and number of tubes with depend upon the design considerations and through-put of a particular reformation system. The natural gas and steam reactant stream passes downwardly through the reaction tubes 24 and around the catalyst packing 32. The reactants are heated to reformation temperature of approximately 1400° F. by heat exchange against reformed reaction product from these reaction tubes, as well as the reformed product from an external reformer which is introduced through product inlet 18. The reformed product from the reaction tubes 24 exits the outlet end 28 of the reaction tubes 24 which is fitted with a perforated end plate 34 which prevents any catalyst from being lost or any potential heat exchange media from entering the reaction tubes or the clogging of the reaction tubes with packing material. The reformed reaction product from the reaction tubes as well as the reformed product from an external reformer are blended in the vicinity of the reformer reactor lower end 14 and pass together longitudinally up along the external surfaces of the reaction tubes 24 in order to provide the heat of reaction for the reformation in the tubes by indirect heat exchange. The thus produced reformation product containing substantial hydrogen is removed in the main product outlet 40 by way of apertures 35 in closed tube 33 which maintains the correct spacing between the reaction tubes. Additional closed tubes 33 are contemplated, but not illustrated. Valve 42 controls the flow of product in line 33. A portion of the product may be bypassed in tube 31 to control temperature. Bypass product passes from tube 31 through bypass outlet 38 controlled by valve 39. Bypass product in line 46 and main product in line 44 can be combined and leave the reactor together in line 46.

The present reactor configuration provides a unique and efficient mode for reforming natural gas to produce hydrogen wherein the residual heat from the reformation both of the reaction product of this reformation zone as well as that heat from the product of a parallel and preferably main or primary reformer is combined by mixing the two products and passing the combined product stream along the external surfaces of the longitudinal reaction tubes in order to heat the reactants by indirect heat exchange. When the reformation reactor of the present invention as shown in FIG. 1 is utilized in conjunction with conventional reformation reactors, increased efficiency in operation is achieved by the reduction in the amount of fuel necessary to fire in order to produce the heat of reformation and the decrease in the amount of steam produced to effectively utilize the heat produced. The reformation technique set forth above and illustrated in FIG. 1 avoids the production of steam which mode of operation is particularly useful in situations where steam production is of minimal benefit and energy efficiency is of great desirability.

Figure 2:
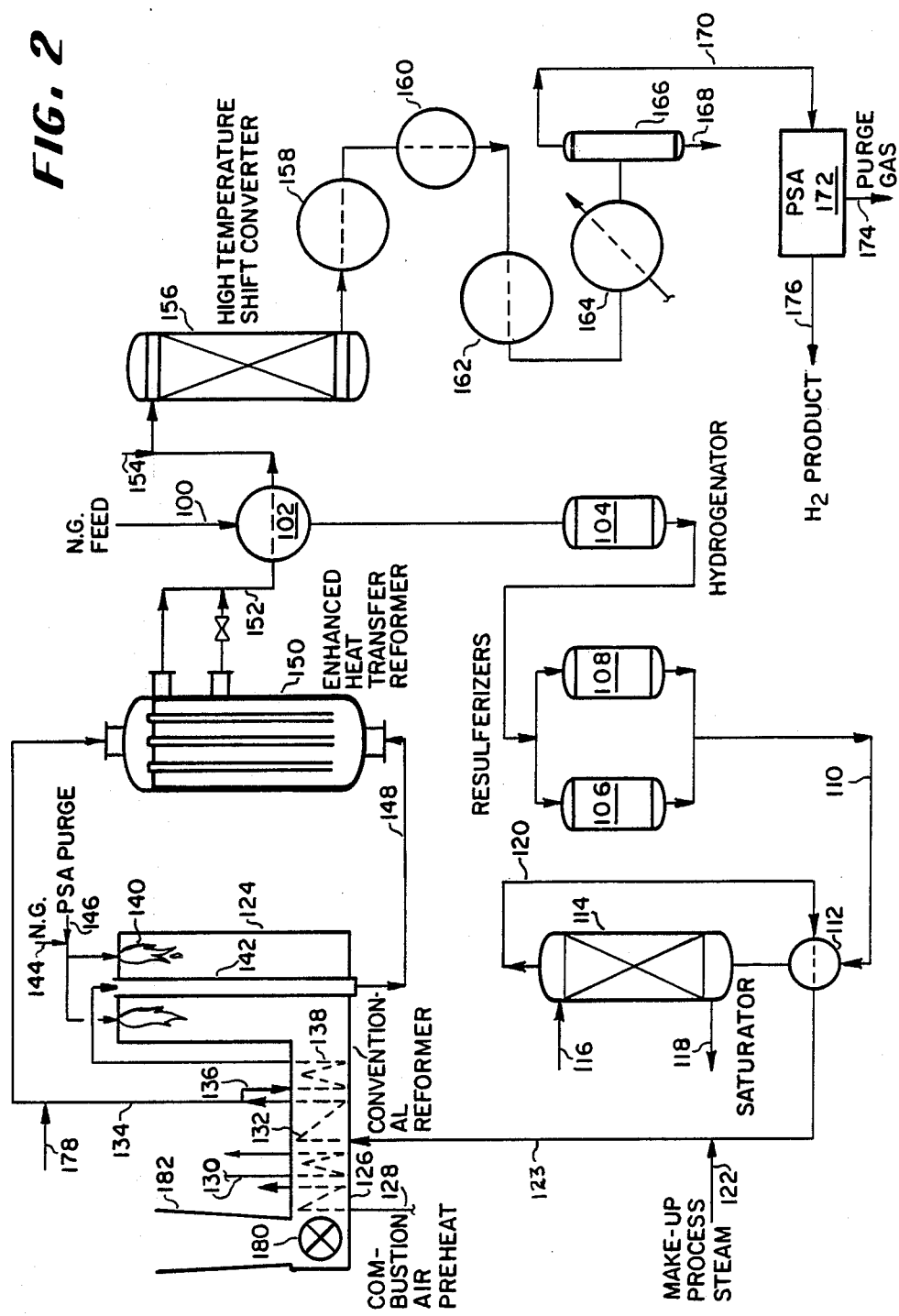
FIG. 2 is a schematic flow scheme of an overall reformation system including the reformer of the present invention as a parallel reformation zone.

This unique reaction apparatus may be utilized effectively in an overall reformation system as is illustrated in FIG. 2. With reference to FIG. 2 a reformation process and plant is illustrated wherein natural gas is introduced in line 100 at approximately 60° F. and 385 psia. The stream is predominantly methane with minor amounts of ethane and lesser amounts of carbon dioxide, nitrogen, propane and butane. The natural gas feed stream passes through a preheater heat exchanger 102 wherein the feed stream is warmed against mixed reformation product in line 152. The feed stream now at 750° F. passes through a desulfurization system including a cobalt-molybdenum catalyst bed hydrogenator 104 wherein various sulfur compounds in the feed gas are converted to hydrogen sulfide and this resulting reduced feed stream is then sent through switching bed zinc oxide desulfurizers 106 and 108 which are operated in a known manner to remove the hydrogen sulfide trace contaminent in the natural gas feed stream. The feed stream now in line 110 is cooled in the heat exchanger 112 before being introduced into the saturator column 114 wherein the natural gas is saturated with hot water vapor introduced through line 116 with the residual water removed for recycle in line 118. The saturator 114 effectively entrains moisture in the feed and results in a steam content in the feed stream without the requirement for steam production from external means or methods. The saturated natural gas reformation feed in line 120 then passes through heat exchanger 112 and has additional steam added, when necessary, through line 122. This stream is then further warmed in the combustion furnace 124 in the downstream portion or convection section 126 of the furnace 124 which utilizes the heated gas effluent from the main reformer 142. The feed passes through a heat exchange coil 132 before it is split into a main feed stream 136 and a bypass feed stream 134. The main feed stream 136 is further warmed in heat exchange coil 138 against the combustion vapors of the furnace 124. Additional heat is utilized to produce steam in line 130 and to preheat combustion air in line 128 of the furnace 124. Induced draft circulation in the furnace is achieved by a blower 180 which vents combustion effluent to stack 182.

The main reformer feed stream in line 136 constitutes 65% of the feed stream in line 123 while the bypass feed stream in line 134 constitutes approximately 35% of the feed stream in line 123. The main feed stream is further warmed in heat exchange core 138 to a temperature of approximately 1050° F. and is then passed through a traditional reformer furnace which is illustrated for this purpose as a single catalytic tube 142. However, it can be realized that, in fact, the conventional reformer has an array of catalyst tubes around which the combustion gases from the burner 140 pass to heat the reformer feed 136 to the reformation temperature sufficient to produce hydrogen, carbon monoxide and carbon dioxide. The burners 140 are fed with natural gas in line 144 which is supplemented with a reformation waste stream in line 146 comprising predominantly carbon dioxide and hydrogen with lesser amounts of methane, carbon monoxide, water and nitrogen. The reformed product from the traditional reformer 142 is removed in line 148 at approximately 1600° F. and with a composition of 49% hydrogen, 33% steam, 9.5% carbon monoxide, 5.3% carbon dioxide and 2.9% methane.

The bypass feed stream in line 134 is mixed with additional steam from line 178, as needed, and this saturated feed is then introduced at approximately 700° F. into a parallel reformer comprising the unique enhanced heat transfer reformer 150 of the present invention which is illustrated in greater detail in FIG. 1. The saturated natural gas passes down through a plurality of arrayed reaction tubes packed with reformation catalyst and the reaction feed stream in the tubes is heated, not by combustion gases from a burner, but rather by the indirect heat exchange of the primary reformation product in line 148 as well as the co-mingled and mixed product from the reaction tubes of the enhanced heat transfer reformer 150. As the reaction feed passes down through the reaction tubes and mingles with the reformation product stream from the conventional reformer 142 the mixed reaction product then passes longitudinally back up along the exterior of the reaction tubes to provide the heat of reaction necessary for the reactor without incurring additional cost or penalty for the external production of reaction heat. This utilization of the heat of the primary reformer 142 in the parallel and auxiliary enhanced heat transfer reformer 150 provides an increased energy efficiency for the reformation of an overall quantity of natural gas to produce hydrogen product gas. The mixed reformation product gas is removed in line 152 at approximately 850° F. and passes through a natural gas preheater heat exchanger 102 wherein stream 152 is cooled against the warming feed stream in line 100.

The product stream contains residual carbon monoxide, in this instance, approximately 7% of the overall stream composition and this can be converted to additional hydrogen in a shift reactor 156. Additional steam is added in line 154 and the stream is shifted over traditional catalysts in a known manner wherein the stoichiometric equation for the shift reaction is as follows:

$$CO + H_2O \rightarrow CO_2 + H_2 \qquad (3)$$

The resulting gas which has its carbon monoxide content reduced to less than 2% is then cooled in heat exchanger 158 against water feed to the saturator 114, although this particular stream is not shown. Additional cooling is done through a boiler feed water heat exchanger 160, a makeup water heat exchanger 162 and a cooling water heat exchanger 164. The product stream is then sent to a separation column 166 wherein condensed water is removed in line 168 and the cooled and phase separated product stream in line 170 is passed to a conventional pressure swing adsorption separator 172 comprising a series of switching adsorbent beds wherein various adsorbents are utilized to effect a separation between the hydrogen product and the residual components of the stream including nitrogen, carbon dioxide, carbon monoxide, water and hydrocarbons. The resulting product in line 176 comprises a commercially pure hydrogen stream, while the waste stream in line 174 is recycled to line 146 for combustion of its hydrocarbon and carbon monoxide components in the burner of the conventional reformer furnace 124.

This unique integration of the enhanced heat transfer reformer of the present invention, in a parallel and auxiliary flowscheme with a conventional reformer, effects desirable economies in capital cost and plant operation of a reforming system. Also, because the enhanced heat transfer reformer does not require steam heat for reaction conditions, the steam-make of the overall process is significantly reduced, which is desirable for energy efficiency as well as for applications where an external requirement for such steam is not in existence. Such a process utilizing the enhanced heat transfer reformer in parallel with the more conventional reformer provides a reduction in the natural gas fuel consumption of 10%, while utilizing the heat of the main reformer for the auxiliary reformer reaction conditions. In addition, with the utilization of the enhanced heat transfer reformer as an auxiliary reformation zone, the size of the main reformer may be designed to be up to 25% less than traditionally required, thereby effecting a significant reduction in capital costs. When all of the criteria for an integrated hydrogen reformation plant are considered, including the down sizing of equipment and the reduction in steam-make and fuel consumption, the overall efficiency of the plant shown in FIG. 2 results in a 20% increase in radiant efficiency of the overall furnace over more traditional reformation plants producing hydrogen product.

The present invention has been set forth with reference to several preferred embodiments. However, the invention should not be deemed to be limited to those particular embodiments, as it is well within the skill of those practicing in the art to contemplate obvious variations from those embodiments. Therefore, the scope of the invention should be ascertained from the claims which follow.

I claim:
1. A method for reforming hydrocarbons in a plural stage reformation wherein a first reformation of a first reactant stream occurs in a first reforming zone heated by combustion furnace gases and a second reformation of a second reactant stream occurs in a second reforming zone which second reformation comprises the steps of:
   (a) introducing said second reactant stream of hydrocarbons and steam at elevated temperature and pressure into said second reforming zone;
   (b) passing said second reactant stream through a plurality of reaction tubes while contacting said second reactant stream with reforming catalyst packed in said tubes;
   (c) introducing a reformed reaction product at elevated temperature and pressure into said second reforming zone but outside said tubes at a temperature substantially above the temperature of said second reactant stream at the latter's introduction into said second reforming zone;
   (d) mixing the reformed reaction product with similar product produced from said second reactant stream passing through said reaction tubes;
   (e) heating said second reactant stream to reaction temperature and reforming it in said reaction tubes by heat exchange of said mixed reaction product with said second reactant stream, and
   (f) removing a mixed reaction product of reformed fluid from said second reforming zone.
2. The method of claim 1 wherein said mixed reaction product flows substantially longitudinally along to outside of said reaction tubes from the tube outlet before exiting the reforming zone.
3. A method for reforming hydrocarbons comprising the steps of:
   (a) heating and desulfurizing a hydrocarbon feed stream;
   (b) blending the hydrocarbon feed stream with steam to produce a saturated hydrocarbon feed stream;
   (c) splitting the saturated hydrocarbon feed stream into a main feed stream and a bypass feed stream;
   (d) reforming said main feed stream in a first catalytic reformation zone using the heat of a combustion furnace;
   (e) reforming the bypass feed stream in a second catalytic reformation zone using the heat of the reaction product of the first reformation zone;
   (f) combining the reformation reaction products and introducing them into a shift reactor to shift any carbon monoxide to carbon dioxide and hydrogen, and
   (g) cooling the reaction product and separating the hydrogen content of the reaction product from the remaining reaction components.
4. The method of claim 3 wherein the separation of step (g) is preformed in an adsorptive system of switching packed beds.
5. The method of claim 3 wherein step (b) includes the addition of water to the hydrocarbon feed stream in order to produce steam in-situ to saturate the feed stream.

* * * * *